United States Patent
Terashima et al.

(10) Patent No.: US 6,219,682 B1
(45) Date of Patent: Apr. 17, 2001

(54) VECTOR NORMALIZING APPARATUS

(75) Inventors: Mikihiko Terashima, Kokubunji; Fumiyuki Shiratani, Sagamihara, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/150,008

(22) Filed: Sep. 9, 1998

(30) Foreign Application Priority Data

Sep. 10, 1997 (JP) .................................................. 9-245093

(51) Int. Cl.$^7$ ...................................................... G06F 17/16
(52) U.S. Cl. ............................................. 708/205; 359/107
(58) Field of Search ............................ 708/205; 359/107; 382/157

(56) References Cited

U.S. PATENT DOCUMENTS 5,283,838 * 2/1994 Togawa ................................... 382/14
5,715,336 * 2/1998 Tanaka ................................. 382/301
5,764,549 * 6/1998 Bjorksten et al. ................... 708/205
5,926,296 * 7/1999 Terashima et al. .................. 359/107

* cited by examiner

Primary Examiner—David H. Malzahn
(74) Attorney, Agent, or Firm—Pillsbury Winthrop LLP

(57) ABSTRACT

A vector normalizing apparatus in which information concerning the norm of the original vector is not lost by normalization, and which needs no device that divides vector components by norm. The apparatus includes a vector input device (1) for entering a vector. An additional component calculating device (2) receives the vector entered through the vector input device (1) and calculates an additional component to be added to the vector such that norm of the vector after the addition of the component becomes constant. A vector component adding device (3) adds an output from the additional component calculating device (2) as a component of the entered vector. A normalized vector output device (4) outputs the vector having the component added thereto.

52 Claims, 11 Drawing Sheets

<Euclidean distance>  d1 < d2   m1  Winner element
<Inner product>     D1 < D2   m2  Winner element <Euclidean distance>  d1 < d2   m1  Winner element
<Inner product>     D1 > D2   m1  Winner element <Euclidean distance>  d1>d2  m2 Winner element
<Inner product>  D1>D2  m1 Winner element <Euclidean distance relation between ●>  $X_1^{(a)} : X_1^{(b)}$
<Angle relation between ○>  $X_1^{(a)} : X_1^{(b)}$

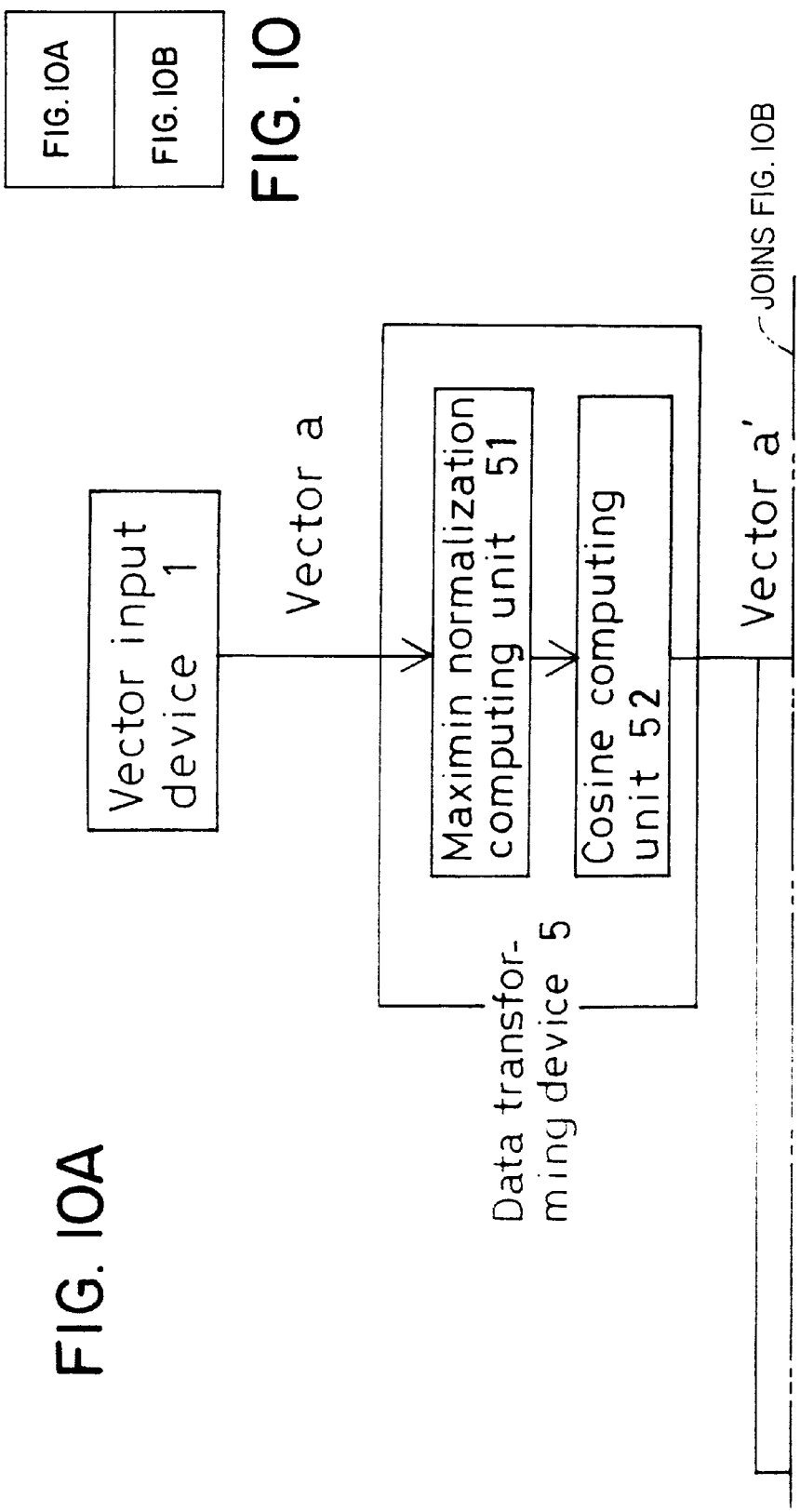

VECTOR NORMALIZING APPARATUS

BACKGROUND OF THE INVENTION

The present invention relates to a vector normalizing apparatus and, more particularly, to a vector normalizing apparatus used in a competitive learning system wherein competitive learning for topological mapping, pattern recognition or the like is executed by deciding a winner element meeting a certain distance measure using an inner product operation, and then performing some operation on the winner element and some elements determined by the winner element.

There are well known competitive learning algorithms that execute topological mapping or pattern recognition by deciding a winner element that meets a certain distance measure, and performing some operation on the winner element and some elements determined by the winner element (T. Kohonen, "Self-Organization and Associative Memory", Third Edition, Springer-Verlag, Berlin, 1989).

These algorithms have a competitive process for selecting a winner element that meets a distance measure, e.g. the Euclidean distance, the Manhattan distance or the inner product, with respect to a certain input. In a case where such a competitive learning algorithm is executed on a computer, any distance measure can be readily used; however, the Euclidean distance is frequently used, which is generally reported to exhibit excellent performance as a distance measure. However, it takes a great deal of time to process large-capacity data, e.g. images.

To perform a Euclidean distance calculation on hardware in order to process large-capacity data, e.g. image, at high speed, it is necessary to use an electrical difference circuit, an electrical square circuit, an electrical summation circuit. Accordingly, the overall size of the circuits becomes exceedingly large; therefore, it is difficult to realize a Euclidean distance calculation on hardware in the present state of the art. Meanwhile, an algorithm using the inner product as a distance measure does not need an electrical difference circuit. If this algorithm is realized by using optical hardware, high-speed processing can be effectively performed because it is possible to realize an inner product operation while utilizing the nature of light, i.e. high-speed and parallel propagation. Some competitive learning systems that execute an inner product operation by an optical system have already been proposed [e.g. Taiwei Lu et al., "Self-organizing optical neural network for unsupervised learning", Opt. Eng., Vol.29, No.9, 1990; J. Duivillier et al., "All-optical implementation of a self-organizing map", Appl. Opt., Vol.33, No.2, 1994; and Japanese Patent Application Unexamined Publication (KOKAI) Nos. 5-35897 and 5-101025].

When competitive learning is performed by using the inner product as a distance measure, the accuracy of competitive learning tends to become lower than in the case of using the Euclidean distance. This may be explained as follows.

As shown in FIG. 1, let us consider a two-dimensional vector X as an input vector and candidates m1 and $m_2$ for a weight vector meeting a certain distance measure with respect to the input vector X. When the Euclidean distance is used, a weight vector which is at the shortest distance from the input vector becomes a winner element; therefore, $m_1$ becomes a winner element from the relation between the distances $d_1$ and $d_2$ in FIG. 1, i.e. $d_1 < d_2$. When the inner product is used, a weight vector having the largest inner product value is equivalently most similar to the input vector and becomes a winner element. In FIG. 1, the inner product value is expressed by the product of the orthogonal projection $D_i$ (i=1, 2) on X of $m_i$ (i=1, 2) and the L2-norm of X. It should be noted that L2-norm represents the square root of the square sum of vector components. Size comparison between the inner products can be made by comparing the sizes of $D_i$. However, in this case, $D_1 < D_2$, and hence, $m_2$ is unfavorably selected as a winner element. Thus, when the inner product is used, even if a weight vector with a relatively large L2-norm is at a relatively long Euclidean distance from the input vector, the inner product value may become relatively large, resulting in a higher degree of similarity. Accordingly, such a weight vector is likely to become a winner. That is, the degree of similarity in the inner product depends on the L2-norm of each vector. Therefore, L2-norm should preferably be made uniform to perform effective competitive learning. A simple method of uniformizing L2-norm is to divide (normalize) each vector component by L2-norm. By doing so, as shown in FIG. 2, the relations of $d_1 < d_2$ and $D_1 > D_2$ are obtained. Consequently, $m_1$ becomes a winner element whether the Euclidean distance or the inner product is used. Accordingly, effective competitive learning can be performed even if the inner product is used.

It should be noted that there are other norms in addition to L2-norm, i.e. L1-norm, L∞-norm, etc. No matter which norm is used, it is possible to perform competitive learning that is effective to a certain extent. Among them, L2-norm is the best. The reason for this will be explained later.

In general, when L1-norm, L2-norm or other norm is uniformized by normalization, information concerning the norm of the original vector is lost. For example, if each component of the vector is divided by L2-norm to uniformize L2-norm, the original L2-norm information is lost. In the case of competitive learning for identifying only the direction of vector data, the norm information of the data may be lost. However, ordinary competitive learning is not always performed to identify only the direction of vector data. In many cases, satisfactory learning cannot be effected if the norm information is lost.

SUMMARY OF THE INVENTION

Accordingly, we give the following condition as a requirement that should be satisfied by the vector normalizing apparatus according to the present invention:

(A-1) Information concerning the norm of the original vector is not lost by normalization.

In general, normalization is effected by dividing each vector component by the norm that is to be normalized. However, this normalization process involves problems such as the undesired divergence of data when the norm is zero, for example. Therefore, it is desirable for the vector normalizing apparatus to need no device that divides vector components by norm.

Accordingly, we add the following condition as another requirement that should be satisfied by the vector normalizing apparatus according to the present invention:

(A-2) The vector normalizing apparatus needs no device that divides vector components by norm.

In view of the above-described problems, an object of the present invention is to provide a vector normalizing apparatus that satisfies the conditions (A-1) and (A-2), i.e. a vector normalizing apparatus in which information concerning the norm of the original vector is not lost by normalization, and which needs no device that divides vector components by norm.

To attain the above-described object, the present invention provides a vector normalizing apparatus including a vector input device for entering a vector, and an additional component calculating device that receives the vector entered through the vector input device and calculates an additional component to be added to the entered vector such that norm of the vector after the addition of the component becomes constant. The vector normalizing apparatus further includes a vector component adding device for adding an output from the additional component calculating device as a component of the entered vector.

In this case, it is desirable that the vector normalizing apparatus should further include a transformation device that performs transformation for each component of the vector entered through the vector input device to limit the range of values which each component of the entered vector may assume.

It is also desirable that the range of values which the output from the additional component calculating device may assume should be the same as the range of values which each component of the entered vector may assume.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
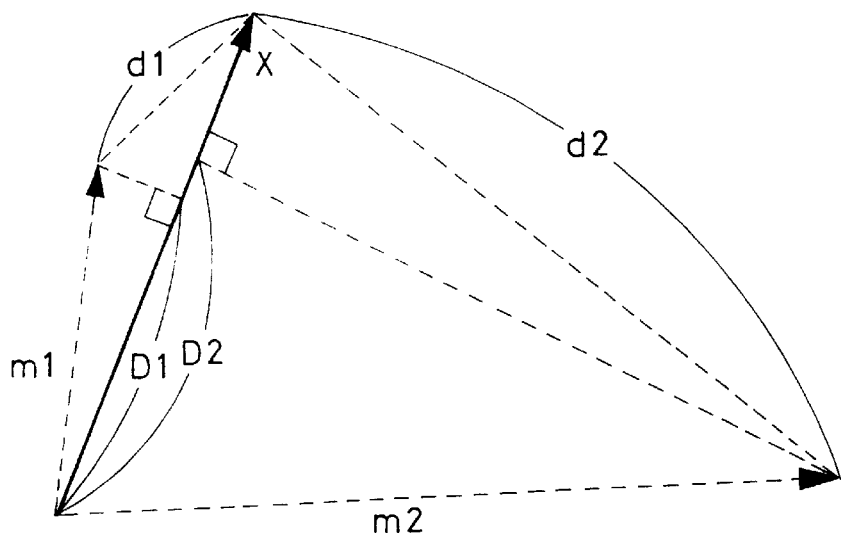
FIG. 1 is a diagram showing the process of deciding a winner vector by an inner product operation in a case where vector data is not normalized.
Figure 2:
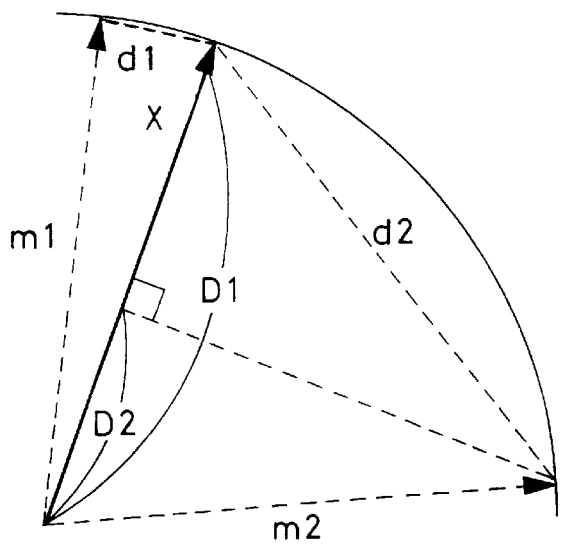
FIG. 2 is a diagram showing the process of deciding a winner vector in a case where vector data is normalized by L2-norm in the case of FIG. 1.

First, the reasons why the vector normalizing apparatus according to the present invention adopts the above-described arrangement, together with the function thereof, will be described below.

The basic form of the present invention is a vector normalizing apparatus that normalizes an input vector or a weight vector for a competitive learning system that calculates an inner product of an input vector and each vector in the group of weight vectors to thereby associate the input vector with one vector in the group of weight vectors. The vector normalizing apparatus includes a vector input device for entering an input vector or weight vector to be normalized, and an additional component calculating device that calculates at least one additional component to be added to the entered vector such that norm of the vector after the addition of the component becomes uniform. The vector normalizing apparatus further includes a vector component adding device that adds the additional component calculated by the additional component calculating device to the input vector or weight vector, and a normalized vector output device for outputting the input vector or weight vector having the additional component added thereto.

The above-described vector normalizing apparatus corresponds to a first to sixth embodiments (described later). The operation of the vector normalizing apparatus will be described below. First, the vector input device enters an input vector or weight vector to be normalized into the vector normalizing apparatus according to the present invention. Subsequently, the additional component calculating device calculates an additional component to be added to the entered vector such that norm of the vector after the addition of the component becomes constant. For example, let us assume that the vector entered into the vector normalizing apparatus is a two-dimensional vector $X=(X_1,X_2)$, and one component is to be added to the entered vector. In this case, the additional component calculating device calculates, as an additional term, the third component of X' in the following equation (1):

$$X'=(X_1, X_2, k-(X_1+X_2)) \qquad (1)$$

where k is a constant.

Subsequently, the vector component adding device adds the component calculated by the additional component calculating device to the input vector or weight vector to produce the above vector X'.

Finally, the normalized vector output device outputs the vector X'. At this time, the L1-norm of X' assumes a constant value, i.e. k, with respect to all vectors X. The additional component [the third component in the case of Eq. (1)] contains L1-norm $(X_1+X_2)$ of X.

Accordingly, it will be understood that information concerning the norm of the original vector is not lost by normalization [condition (A-1)]. Moreover, it will be clear that the vector normalizing apparatus needs no device that divides vector components by norm [condition (A-2)].

As stated above, if at least one vector component is added to the entered vector to thereby normalize the norm of the vector having the component added thereto, information concerning the norm of the original vector is not lost by normalization. Therefore, learning can be effected with sufficiently high accuracy even in the case of identifying something other than the direction of vector data.

The additional component calculating device of the above-described vector normalizing apparatus may be arranged to calculate at least one additional component such that the L2-norm of the vector after the addition of the component becomes uniform.

The vector normalizing apparatus arranged as described above corresponds to the second to sixth embodiments (described later). The operation of the vector normalizing apparatus will be described below. First, the vector input device enters an input vector or weight vector to be normalized into the vector normalizing apparatus according to the present invention. Subsequently, the additional component calculating device calculates an additional component to be added to the entered vector such that the norm of the vector after the addition of the component becomes constant. Assuming that the vector entered into the vector normalizing apparatus is a two-dimensional vector $X=(X_1, X_2)$ and one component is to be added to the entered vector, the additional component calculating device calculates, as an additional term, the third component of X' in the following equation (2):

$$X'=(X_1, X_2, \sqrt{\{k-(X_1^2+X_2^2)\}}) \qquad (2)$$

where k is a constant.

Subsequently, the vector component adding device adds the component calculated by the additional component calculating device to the input vector or weight vector to produce the vector X'.

Finally, the normalized vector output device outputs the vector X'. It will be understood that at this time the L2-norm of X' assumes a constant value, i.e. k, with respect to all vectors X.

Furthermore, the additional component [the third component in the case of Eq. (2)] contains the L2-norm of X, i.e. $\sqrt{(X_1^2+X_2^2)}$, as a component of the function. Accordingly, it will be understood that information concerning the norm of the original vector is not lost by normalization [condition (A-1)].

Incidentally, there are generally various kinds of norms. No matter which norm is uniformized, it is possible to perform somewhat accurate competitive learning. However, it is desirable to use L2-norm as norm to be uniformized.

Figure 3:
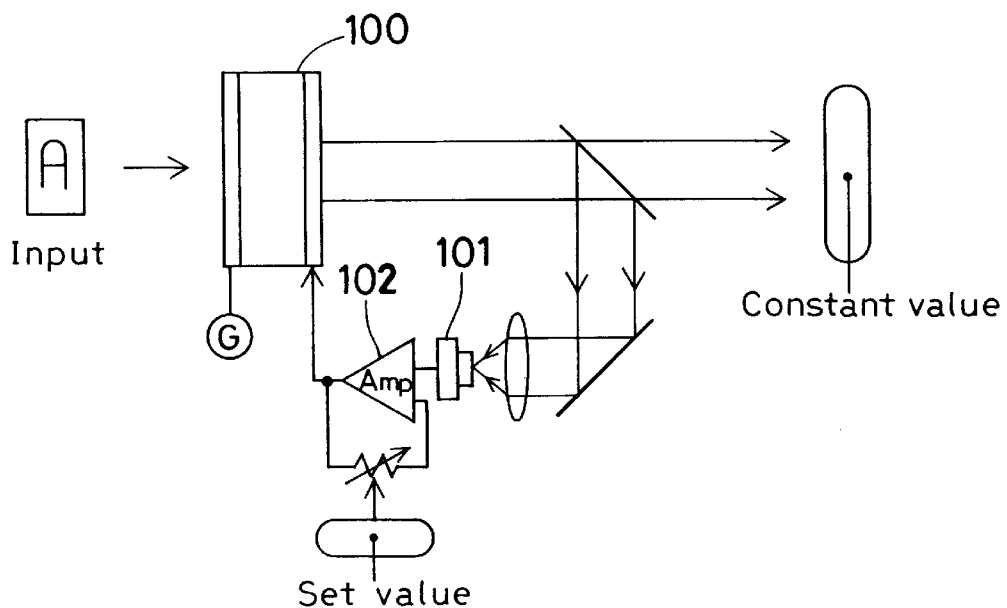
FIG. 3 is a diagram for explaining normalization by L1-norm in a conventional competitive learning system using a optical system.

Let us first show normalization by L1-norm, which is well known besides L2-norm. The systems disclosed in Japanese Patent Application Unexamined Publication (KOKAI) Nos. 5-35897 and 5-101025 are intended to increase the accuracy of competitive learning using the inner product operation by adjusting the magnitude of the input vector components. More specifically, in a vector normalizing apparatus shown in FIG. 3, a vector is displayed on an intensity modulation type MSLM 100, and the intensity value of the displayed vector is detected by a light-receiving element 101. A current value thus obtained is converted into a voltage value by an amplifier 102 to vary the driving voltage applied to the MSLM 100, thereby effecting normalization such that the intensity value is constant. This corresponds to the normalization by L1-norm where the sum of the vector components is fixed at a constant value.

Figure 4:
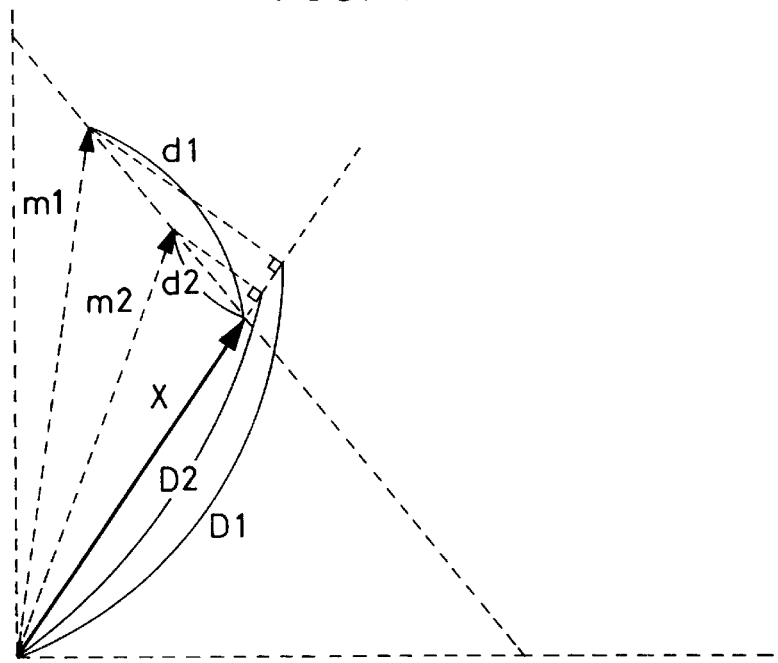
FIG. 4 is a diagram showing the process of deciding a winner vector in a case where vector data is normalized by L1-norm.

Let us show the problem experienced with the normalization by L1-norm. Let us assume that, as shown in FIG. 4, a two-dimensional vector X is entered, and $m_1$ and $m_2$ are candidates for a weight vector with respect to the entered vector X, as in the case of FIG. 1. It should be noted that in all the vectors X, $m_1$, and $m_2$, the sum of vector components is fixed at a constant value. When the Euclidean distance is used, a weight vector that is at the shortest distance from the entered vector becomes a winner element; therefore, $m_2$ becomes a winner element. However, when the inner product is used, $m_1$ becomes a winner element from the relation of $D_1 > D_2$. Accordingly, even if normalization is effected by L1-norm, the degree of similarity in the inner product still depends on the L2-norm of each vector. Therefore, it may be impossible to perform effective competitive learning. The systems according to the prior art, i.e. Taiwei Lu et al., "Self-organizing optical neural network for unsupervised learning", Opt. Eng., Vol.29, No.9, 1990 and J. Duivillier et al., "All-optical implementation of a self-organizing map", Appl. Opt., Vol.33, No.2, 1994, also use the normalization by L1-norm, which is similar to the above.

There are various other norms, e.g. L∞-norm. However, effective competitive learning cannot be performed with these norms in comparison to the normalization by L2-norm for the reason that the degree of similarity in the inner product depends on the L2-norm of each vector.

It will be understood from the foregoing discussion that if the L2-norm of the input vector or weight vector is uniformized, competitive learning using the inner product as a distance measure can be performed with a high degree of accuracy closer to that in the case of using the Euclidean distance as a distance measure.

Moreover, it will be clear that the vector normalizing apparatus needs no device that divides vector components by norm [condition (A-2)].

As stated above, if at least one vector component is added to the entered vector to normalize the norm of the vector, information concerning the norm of the original vector is not lost by normalization. Therefore, learning can be effected with sufficiently high accuracy even in the case of identifying something other than the direction of vector data. Moreover, because normalization is performed such that L2-norm is made uniform, competitive learning using the inner product as a distance measure can be performed with a high degree of accuracy close to that in the case of using the Euclidean distance as a distance measure. Furthermore, because the vector normalizing apparatus needs no device that divides vector components by norm, there is no problem that data may be diverged by normalization.

The above-described vector normalizing apparatus may be arranged such that the additional component calculating device calculates the number of additional components that is equal to the number of components of the input vector or weight vector, and the vector component adding device adds the number of additional components that is equal to the number of components of the input vector or weight vector.

The vector normalizing apparatus arranged as described above corresponds to the third to sixth embodiments (described later). The operation of the vector normalizing apparatus will be described below. First, the vector input device enters an input vector or weight vector to be normalized into the vector normalizing apparatus according to the present invention. Subsequently, the additional component calculating device calculates the number of additional components that is equal to the number of components of the input vector or weight vector. At this time, the additional components are calculated such that the norms of all vectors after the addition of the components become uniform. Subsequently, the vector component adding device adds the calculated additional components to the entered vector. Finally, the normalized vector output device outputs the vector having the additional components added thereto.

Incidentally, the vector normalized by the vector normalizing apparatus is used in a competitive learning system. In general, there is a limit to the number of gray levels usable for data on hardware. For example, when a vector is displayed on a liquid-crystal display device, the number of gray levels possible is of the order of several hundreds. Therefore, to use the limited gray level capacity effectively, it is preferable that the range of values that each vector component may assume should be approximately constant.

The reason why the range of values which each vector component may assume becomes approximately constant in a case where the number of additional components that is equal to the number of components of the input vector or weight vector are calculated and the calculated additional components are added to the vector will be explained below using an example.

In a case where the vector entered into the vector normalizing apparatus is a two-dimensional vector $X=(X_1,X_2)$ and the norm of the vector that is to be made constant after the addition of components is L1-norm, X' as given by the following equation (3) should be produced by adding two components:

$$X'=(X_1,X_2,k-X_1,k-X_2) \qquad (3)$$

where k is a constant.

At this time, the L1-norm of X' assumes a constant value, i.e. 2k, with respect to all vectors X. Furthermore, the additional components [the third and fourth components in the case of Eq. (3)] contain a value obtained by resolving the L1-norm of X, although it does not coincide with the L1-norm in the strict sense. In the general competitive learning using the inner product, consideration is often given to the size of the norm lost by normalization. Therefore, the additional components should preferably contain a value obtained by resolving the L1-norm, which enables the size to be decided even if it does not coincide with the L1-norm in the strict sense. Although the same constant is used as k of the third and fourth components as additional components, different constants may be used for the two additional components.

In a case where the norm of the vector that is to be made constant after the addition of components is L2-norm, X' as given by the following equation (4) should be produced by adding two components:

$$X'=(X_1,X_2,\sqrt{(k-X_1^2)},\sqrt{(k-X_2^2)}) \qquad (4)$$

where k is a constant.

At this time, the L2-norm of X' assumes a constant value, i.e. $\sqrt{(2k)}$, with respect to all vectors X. Furthermore, the additional components [the third and fourth components in the case of Eq. (4)] contain a value obtained by resolving the L2-norm of X. It is sufficient for the additional components to contain a value obtained by resolving the L2-norm of X for the reason stated above. It should be noted that although the same constant is used as k of the additional components, different constants may be used for the two additional components as in the case of the above.

Next, let us show that in the case of X' given by Eq. (3) or (4), the range of values that each component of the vector may assume after normalization is approximately constant.

First, let us compare X' in Eq. (1) with X' in Eq. (3).

Assuming that values which $X_1$ and $X_2$ may assume are in the range of from 0 to $\theta$, for example, if k in Eq. (1) is so selected that the range of values which the third component may assume is close to that of $X_1$ and $X_2$, the range of possible values of the third component is given by $$0<(\text{third component})<2\theta,\ k=2\theta \qquad (5)$$

That is, $$0<\text{first component})<\theta,\ 0<(\text{second component})<\theta,\ 0<(\text{third component})<2\theta \qquad (6)$$

On the other hand, in the case of Eq. (3), $$0<(\text{third component}),\ (\text{fourth component})<\theta,\ k=\theta \qquad (7)$$

That is, $$0<\text{first component})<\theta,\ 0<(\text{second component})<\theta,\ 1<(\text{third component})<\theta,\ 0<(\text{fourth component})<\theta \qquad (8)$$

It will be clear that X' in Eq. (3) is better in that the range of values which each vector element may assume is constant [in the case of Eq. (3), the range of possible values of each element is the same].

Next, let us compare X' in Eq. (2) with X' in Eq. (4).

Assuming that values which $X_1$ and $X_2$ may assume are in the range of from 0 to $\theta$, for example, if k in Eq. (2) is so selected that the range of values which the third component may assume is close to that of $X_1$ and $X_2$, the range of possible values of the third component is given by $$0<(\text{third component})<\sqrt{2}\theta,\ k=2\theta^2 \qquad (9)$$

That is, $$0<\text{first component})<\theta,\ 0<(\text{second component})<\theta,\ 0<(\text{third component})<\sqrt{2}\theta \qquad (10)$$

On the other hand, in the case of Eq. (4), $$0<(\text{third component}),\ (\text{fourth component})<\theta,\ k=\theta^2 \qquad (11)$$

That is, $$0<\text{first component})<\theta,\ 0<(\text{second component})<\theta,\ 0<(\text{third component})<\theta,\ 0<(\text{fourth component})<\theta \qquad (12)$$

In this case also, it will be clear that X' in Eq. (4) is better in that the range of values which each vector element may assume is constant [in the case of Eq. (4), the range of possible values of each element is the same].

The foregoing is an explanation that in the case of X' given by Eq. (3) or (4), the range of values which each component of the vector may assume after normalization is approximately constant.

Thus, the range of values which each component of the vector may assume after normalization is constant in a case where the additional component calculating device calculates the number of additional components that is equal to the number of components of the input vector or weight vector and the vector component adding device adds to the entered vector the number of additional components that is equal to the number of components of the input vector or weight vector. As a result, it is possible to effectively use the gray level capacity limited in the competitive learning system and hence possible to perform even more accurate competitive learning.

The above-described vector normalizing apparatus may further include a data transforming device in a stage preceding the additional component calculating device to limit the range of values which each component of the input vector or weight vector may assume.

The vector normalizing apparatus arranged as described above corresponds to the fourth and fifth embodiments (described later). The operation of the vector normalizing apparatus will be described below. First, the vector input device enters an input vector or weight vector to be normalized into the vector normalizing apparatus according to the present invention. Subsequently, the data transforming device transforms data for each component of the input vector or weight vector so as to limit the range of values which each vector component may assume. Subsequently, the additional component calculating device calculates at least one additional vector component to be added to the input vector or weight vector. Alternatively, the additional component calculating device may be arranged to calculate the number of additional components that is equal to the number of components of the input vector or weight vector. In either case, at least one additional component is calculated such that the norm of the vector after the addition of the component becomes constant with respect to all vectors. The norm to be made constant may be any of norms, e.g. L1-norm or L2-norm. However, L2-norm is preferable as stated above.

Subsequently, the vector component adding device adds to the input vector or weight vector at least one additional vector component or the number of vector components that is equal to the number of components of the input vector or weight vector. Finally, the normalized vector output device outputs the vector having one or more additional components added thereto.

In general, there are various data, e.g. image data, speech data, and flow rate data, as original input information for which an input vector or weight vector to be used in competitive learning is produced. Therefore, the range of values that each component of a vector entered into the vector normalizing apparatus may assume is not always constant. As has been stated in the section regarding problems to be solved by the present invention, it is desirable from the viewpoint of making good use of the limited gray level capacity on hardware that there should be no variations in the range of values which each vector component may assume. For this reason, the data transforming device limits the range of values that each element of the input vector or weight vector may assume. By doing so, it is possible to eliminate variations in the range of possible values of the vector components. Data transformation for each component may be performed as shown by the following equation (13) by way of example:

$$X_i^{(j)'} = (X_i^{(j)} - \min X_i^{(j)}) / (\max X_i^{(j)} - \min X_i^{(j)}) \quad (13)$$

Regarding the above equation (13), the entered vector before transformation is $$X^{(j)} = (X_1^{(j)}, X_2^{(j)}, \ldots X_n^{(j)})$$

where n is the number of vector components. The vector after transformation is $$X^{(j)'} = (X_1^{(j)'}, X_2^{(j)'}, \ldots, X_n^{(j)'})$$

Further, i is a number given to each component of the vector (i=1 to n), and j is a number given to each vector (j=1 to m).

In the case of Eq. (13), each component of the vector after transformation assumes a value in the range of from 0 to 1 irrespective of the range of values that each vector component may assume before transformation. Although Eq. (13) contains division, the possibility that the denominator of the fraction may assume zero need not be particularly considered for the reason stated below. The denominator is a difference between the maximum and minimum values for each component, and it becomes zero when the maximum and minimum values coincide with each other. However, the fact that the maximum and minimum values coincide with each other means that the component concerned assumes a constant value with respect to all vectors. This is an unnecessary component from the viewpoint of an input vector used in competitive learning. Therefore, such a component should be eliminated from the ector components from the beginning or should be transformed into an appropriate constant value. Accordingly, the possibility that the denominator of Eq. (13) may assume zero need not be particularly considered. On the other hand, a vector whose norm is zero is generally expected to appear very much. Therefore, it is preferable for the vector normalizing apparatus to have no device that divide vector components by norm.

In a case where the vector normalizing apparatus has a data transforming device that transforms data for each component as stated above, the data transforming device transforms data for each component so as to limit the range of values which each component of the input vector or weight vector may assume. Therefore, the gray level capacity limited in the competitive learning system can be effectively used, and it is possible to perform competitive learning of higher accuracy.

The above-described vector normalizing apparatus may be arranged such that the data transforming device transforms data for each component by using the sine function or the cosine function.

The vector normalizing apparatus arranged as described above corresponds to the fifth embodiment (described later). The operation of the vector normalizing apparatus will be described below. First, the vector input device enters an input vector or weight vector to be normalized into the vector normalizing apparatus according to the present invention. Subsequently, the data transforming device transforms data for each component so as to limit the range of values that each component of the input vector or weight vector may assume. The data transformation is performed by using the sine function or the cosine function.

Subsequently, the additional component calculating device calculates at least one vector component to be added to the input vector or weight vector. Alternatively, the additional component calculating device may calculate the number of components to be added that is equal to the number of components of the input vector or weight vector. In either case, at least one additional component is calculated such that the norm of the vector after the addition of the component becomes constant with respect to all vectors. The norm to be made constant may be any of norms, e.g. L1-norm or L2-norm. However, L2-norm is preferable as stated above.

Subsequently, the vector component adding device adds to the input vector or weight vector at least one additional vector component or the number of vector components that is equal to the number of components of the input vector or weight vector. Finally, the normalized vector output device outputs the vector having one or more additional components added thereto.

For explanatory simplicity, we consider a two-dimensional vector $X=(X_1,X_2)$ as a vector entered into the vector normalizing apparatus.

First, the data transforming device transforms $X=(X_1,X_2)$ into $(\cos X_1, \cos X_2)$ by using the cosine function. Subsequently, the number of components (two in this case) that is equal to the number of components of the vector before the addition of components are added to the vector according to Eq. (4) such that the L2-norm of the vector becomes constant. Thus, X' is produced. It should be noted that k in Eq. (4) is assumed to be 1. This is equivalent to making the value of L2-norm √2.

$$X'=(\cos X_1, \cos X_2, \sqrt{(1-\cos^2 X_1)}, \sqrt{(1-\cos^2 X_2)}) = (\cos X_1, \cos X_2, \sin X_1, \sin X_2) \quad (14)$$

As has been stated above, X' is used in a competitive learning system, and the degree of similarity between vectors is judged by the inner product value. At this time, it is desirable that the size relation in terms of distance between vectors considered in the Euclidean space and the size relation in terms of angle between vectors considered in the inner product space should agree with each other. If the two size relations agree with each other, competitive learning using the inner product as a distance measure can be performed with a high degree of accuracy close to that in the case of using the Euclidean distance as a distance measure.

The following is a description of how much the size relation in terms of distance between arbitrary vectors X in the Euclidean space and the size relation in terms of angle between arbitrary vectors X' in the inner product space agree with each other.

Let us consider the relation between the first component of $X=(X_1, X_2)$ and the pair of first and third components of X'. Similarly, the second component of $X=(X_1, X_2)$ corresponds to the pair of second and fourth components of X'.

Figure 5:
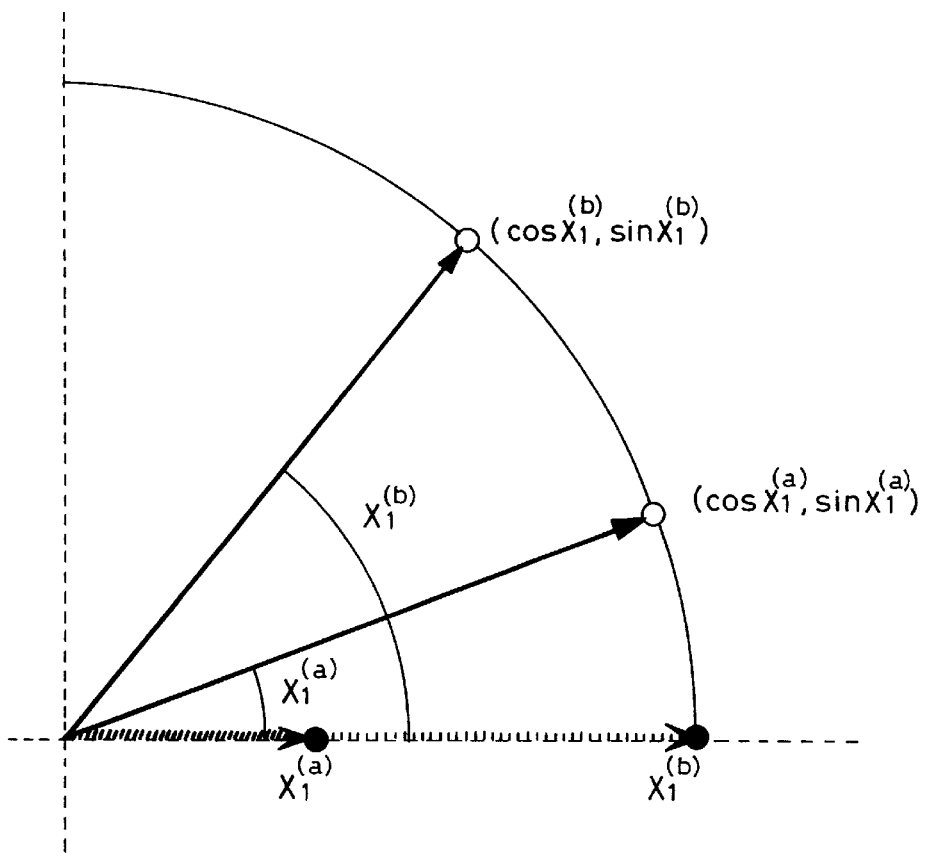
FIG. 5 is a diagram for explaining that the size relation in terms of distance between vectors in the Euclidean space and the size relation in terms of angle between vectors in the inner product space agree with each other.

The following description will be given by using the former relation because the identical discussion can be given of the former and latter relations. That is, let us examine the relation between $X_1$ and $(\cos X_1, \sin X_1)$. All data of the component $X_i$ is represented by $X_i^{(j)}$ (i is a number given to each component, and j is a number indicating data in the component). Let us assume i=1 and j=a,b and consider two representative points $X_1^{(a)}$ and $X_1^{(b)}$. In this case, $(\cos X_1^a, \sin X_1^{(a)})$ and $(\cos X_1^{(b)}, \sin X_1^{(b)})$ correspond to the two points, respectively. In FIG. 5, $X_1^{(a)}$ and $X_1^{(b)}$ are plotted using black circles, and $(\cos X_1^{(a)}, \sin X_1^{(a)})$ and $(\cos X_1^{(b)}, \sin X_1^{(b)})$ are plotted using white circles.

As will be understood from FIG. 5, the relation between the distance from the origin to one black circle and the distance from the origin to the other black circle is expressed by $X_1^{(a)}:X_1^{(b)}$. The relation between the angle that the line segment from the origin to one white circle makes with the abscissa axis and the angle that the line segment from the origin to the other white circle makes with the abscissa axis is also $X_1^{(a)}:X_1^{(b)}$. The distance relation and the angle relation agree with each other. This holds true not only for such representative points but also for general points. In general, the size relation in the Euclidean space between arbitrary scalars $X_1^{(j)}$ in each component (e.g. 1) agrees with the size relation in terms of angle between the corresponding vectors $(\cos X_1^{(j)}, \sin X_1^{(j)})$.

That is, in each component i of X, the size relation in the Euclidean space agrees with the angle size relation between the corresponding vectors. In the case of a vector X in which component elements $X_i$ are arrayed with respect to all i, and a vector X' in which pairs $(\cos X_i, \sin X_i)$ corresponding to $X_i$ are arrayed as component elements with respect to all i, the size relation in the Euclidean space and the angle size relation between the corresponding vectors do not completely agree with each other. However, there is an agreement between the vector components. Therefore, the size relations can be regarded as approximately coincident with each other.

Accordingly, competitive learning using the inner product as a distance measure can be performed with a high degree of accuracy closer to that in the case of using the Euclidean distance as a distance measure.

If data transformation as expressed by Eq. (15) is executed before the transformation using the sine function or the cosine function, the ranges of values which four components of X' may assume can be made all equal to each other (in this case, from 0 to 1) as shown by Eq. (16).

$$\theta_i^{(j)} = \pi/2 \times \left(X_i^{(j)} - \min_j X_i^{(j)}\right) / \left(\max_j X_i^{(j)} - \min_j X_i^{(j)}\right) \quad (15)$$

$$(i = 1, 2)$$

$$X'=(\cos \theta_1, \cos \theta_2, \sin \theta_1, \sin \theta_2) \quad (16)$$

It should be noted that, in Eq. (16), the number (j) given to the vector is omitted because it is a general expression.

Accordingly, the gray level capacity limited in the competitive learning system can be used even more effectively. Although in the foregoing example the cosine function is used for transformation of the components of the two-dimensional vector X, the sine function may be used in place of the cosine function. Although Eq. (15) contains division, the possibility that the denominator of the fraction may assume zero need not be particularly considered for the reason stated below. The denominator is a difference between the maximum and minimum values for each component, and it becomes zero when the maximum and minimum values coincide with each other. However, the fact that the maximum and minimum values coincide with each other means that the component concerned assumes a constant value with respect to all vectors. This is an unnecessary component from the viewpoint of an input vector used in competitive learning. Therefore, such a component should be eliminated from the vector components from the beginning. Accordingly, the possibility that the denominator of Eq. (15) may assume zero need not be particularly considered.

The norm quantity to be uniformized is not necessarily limited to √2, but may be made any desired value, for example, by placing an appropriate constant to be multiplied before the cosine function or the sine function, or by changing k. By doing so, it is possible to adjust the range of data for use in a competitive learning system. However, the former method should be adopted with k set at 1 when it is desired that the size relation in the Euclidean space and the angle size relation between the corresponding vectors should be approximately made coincident with each other by preparing pairs $(\cos X_i, \sin X_i)$ as stated above.

Although in the foregoing example only the cosine function is used in transformation, the sine function may also be used. The cosine function and the sine function may be used mixedly.

Thus, if the data transforming device uses the sine function or the cosine function when data of each component of the input vector or the weight vector is transformed so as to limit the range of values which each component may assume, competitive learning using the inner product as a distance measure can be performed with a high degree of accuracy closer to that in the case of using the Euclidean distance as a distance measure.

Preferred embodiments of the present invention will be described below with reference to FIGS. 6 to 12.

An input vector normalizing apparatus and a weight vector normalizing apparatus can be attained by the same arrangement. Therefore, each embodiment will be described with regard to an input vector normalizing apparatus from the viewpoint of avoiding repetition of description.

[First Embodiment]

Figure 6:
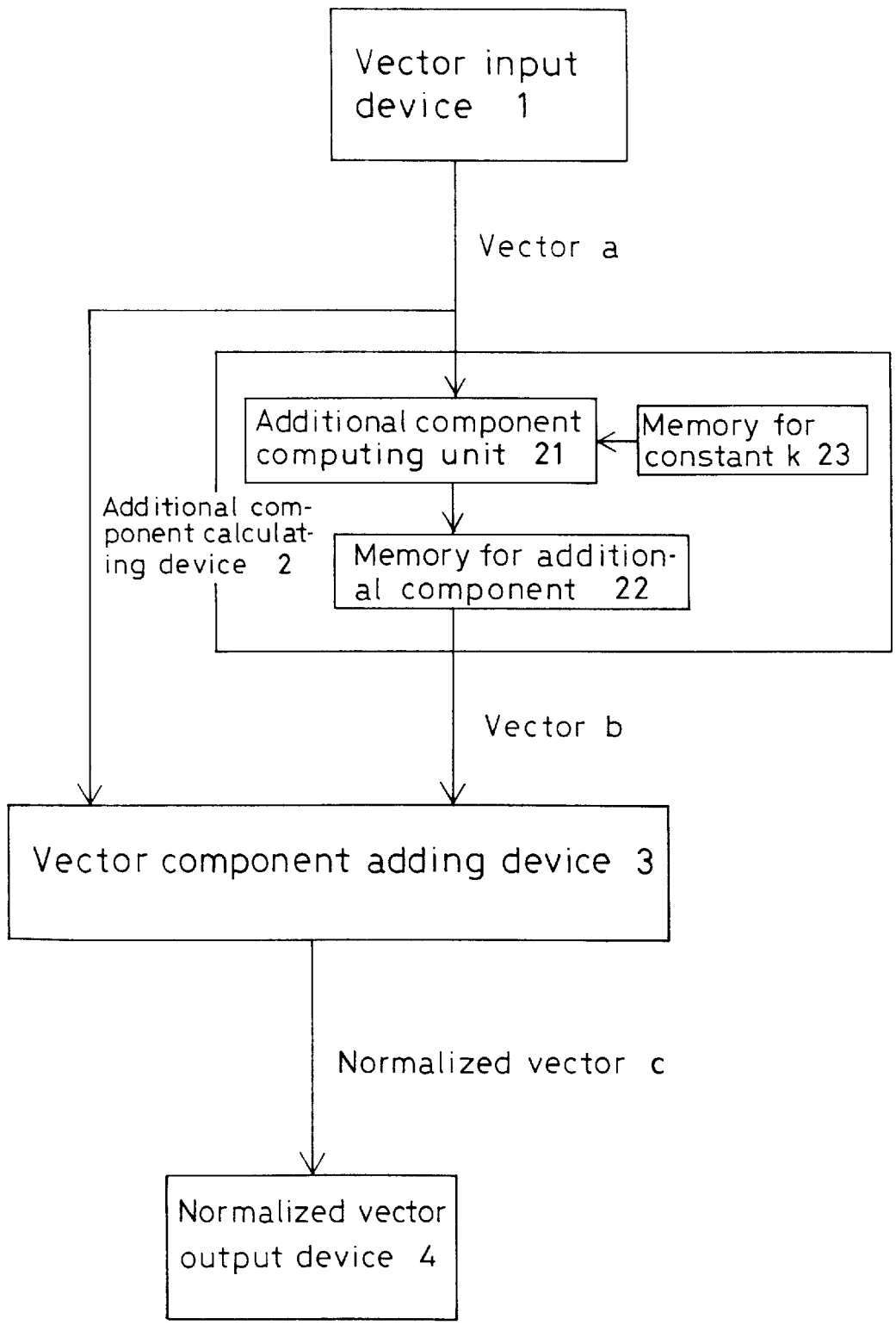
FIG. 6 is a block diagram of a vector normalizing apparatus according to a first embodiment of the present invention.

A vector normalizing apparatus according to this embodiment is shown in the block diagram of FIG. 6. The vector normalizing apparatus has a vector input device 1. In this embodiment, a variety of input devices may be used as the vector input device 1. For example, when the object to be processed in a competitive learning system is image information, it is only necessary to provide a CCD for inputting an image and a device that executes some feature extracting processing to obtain vector information or transforms the image into vectors simply by arranging signals from adjacent pixels. Basically, the vector input device 1 is arranged such that desired information is obtained by using a sensor: for example, a microphone when the object to be processed in the competitive learning system is speech; a density sensor for a density; and a flow sensor for a flow rate. Then, the vector input device 1 transforms the information obtained with the sensor into vectors by some transformation method and inputs them to the system. There are various other vector input devices usable in this embodiment. For example, information captured by other apparatuses (e.g. medical images obtained by a CT apparatus or an MRI apparatus, or three-dimensional images captured by a shape-measuring apparatus) may be inputted as vectors through Ethernet. It is also possible to input such information as vectors through feature extraction.

The vector a entered through the vector input device 1 is sent to an additional component calculating device 2. For example, the additional component calculating device 2 includes an additional component computing unit 21, a memory 23 for constant k and a memory 22 for additional component and calculates an additional component to be added to the vector a.

In the case of Eq. (1) by way of example, the additional component computing unit 21 subtracts the sum of components of the vector a from the constant k read from the memory 23. The result of the subtraction is written into the memory 22 as an additional component. Using the additional component b written into the memory 22 and the vector a, the vector component adding device 3 produces a normalized vector c. The additional component b and the vector a can be combined together, for example, by synthesizing a file on a computer. Finally, the normalized vector c is outputted from a normalized vector output device 4. The normalized vector output device 4 may be implemented in the form of a file output on the computer or by making common use of an input device of the competitive learning system, e.g. a liquid-crystal display device or LEDs.

At this time, the L1-norm of the normalized vector c assumes a constant value, i.e. k, with respect to all normalized vectors c. Furthermore, the additional component [the third component in the case of Eq. (1)] contains the L1-norm $(X_1+X_2)$ of the vector a. Accordingly, it will be understood that information concerning the norm of the original vector is not lost by normalization [condition (A-1)]. In addition, it will be clear that the vector normalizing apparatus needs no device that divides vector components by norm [condition (A-2)].

[Second Embodiment]

Figure 7:
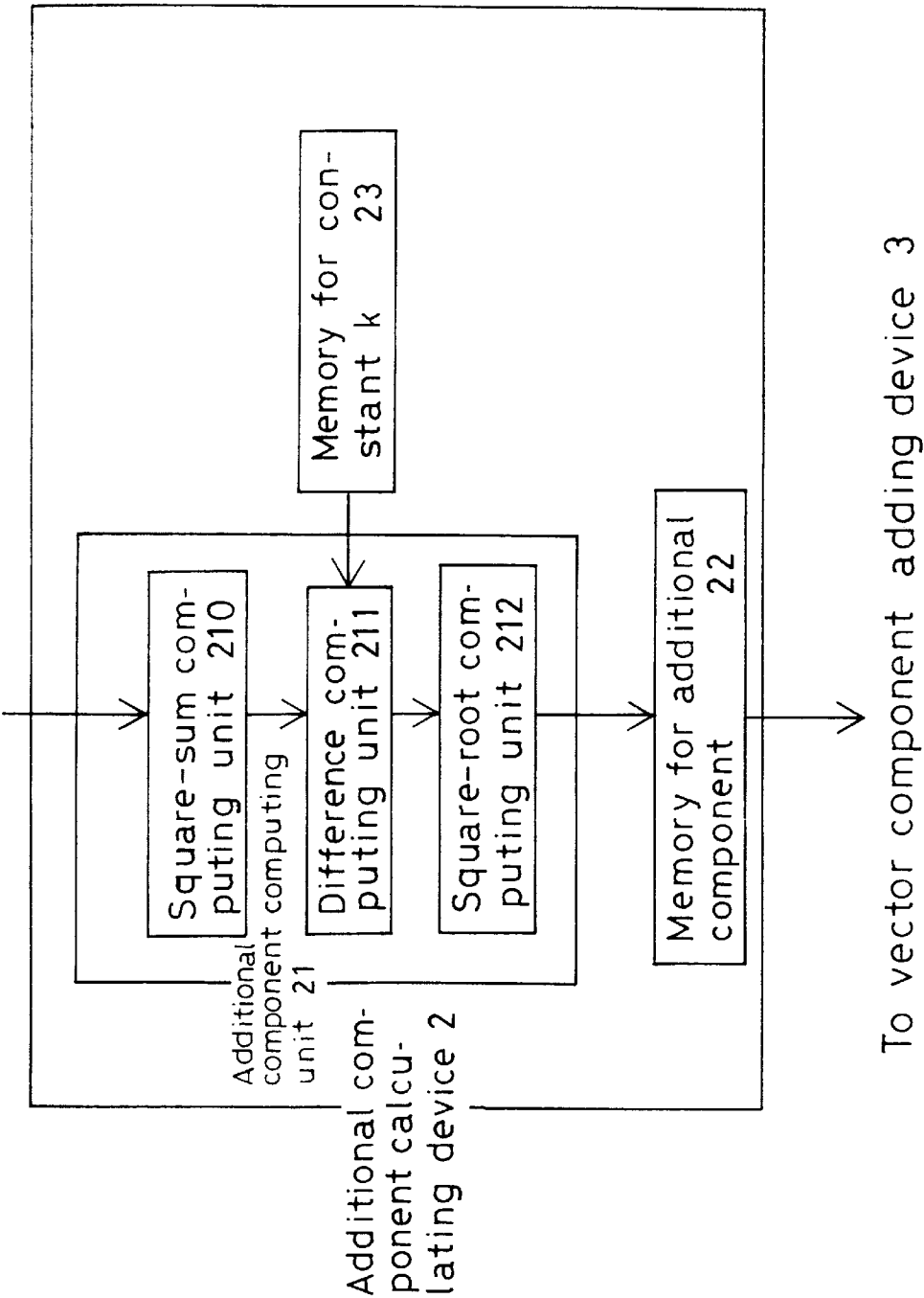
FIG. 7 is a block diagram of an essential part of a vector normalizing apparatus according to a second embodiment of the present invention.

FIG. 7 is a block diagram showing a vector normalizing apparatus according to this embodiment, which is a modification of the first embodiment. The arrangements of the constituent elements of the vector normalizing apparatus are the same as those in the first embodiment except the additional component calculating device 2. Therefore, illustration of the common constituent elements is omitted.

The additional component calculating device 2 in this embodiment includes an additional component computing unit 21, a memory for additional component, and a memory 23 for constant k. The additional component computing unit 21 includes a square-sum computing unit 210, a difference computing unit 211, and a square-root computing unit 212. The additional component calculating device 2 calculates an additional component given by Eq. (2). First, the square-sum computing unit 210 in the additional component computing unit 21 calculates a square sum of the components of a vector a. Subsequently, the difference computing unit 211 subtracts the square sum of the vector components from a constant k read from the memory 23. The square-root computing unit 212 calculates a square root of the result of the subtraction. The square root is written into the memory 22 as an additional component. Using the additional component b written into the memory 22 and the vector a, the vector component adding device 3 produces a normalized vector c. The rest of the operation is the same as in the first embodiment.

The L2-norm of the normalized vector c assumes a constant value, i.e. k, with respect to all normalized vectors c. Furthermore, the additional component [the third component in the case of Eq. (2)] contains $\sqrt{(X_1^2+X_2^2)}$ as a function, which is the L2-norm of the vector a. Accordingly, it will be understood that information concerning the norm of the original vector is not lost by normalization [condition (A-1)]. It will also be understood that the L2-norm of the normalized vector c is uniform. In addition, it will be clear that the vector normalizing apparatus needs no device that divides vector components by norm [condition (A-2)].

[Third Embodiment]

Figure 8:
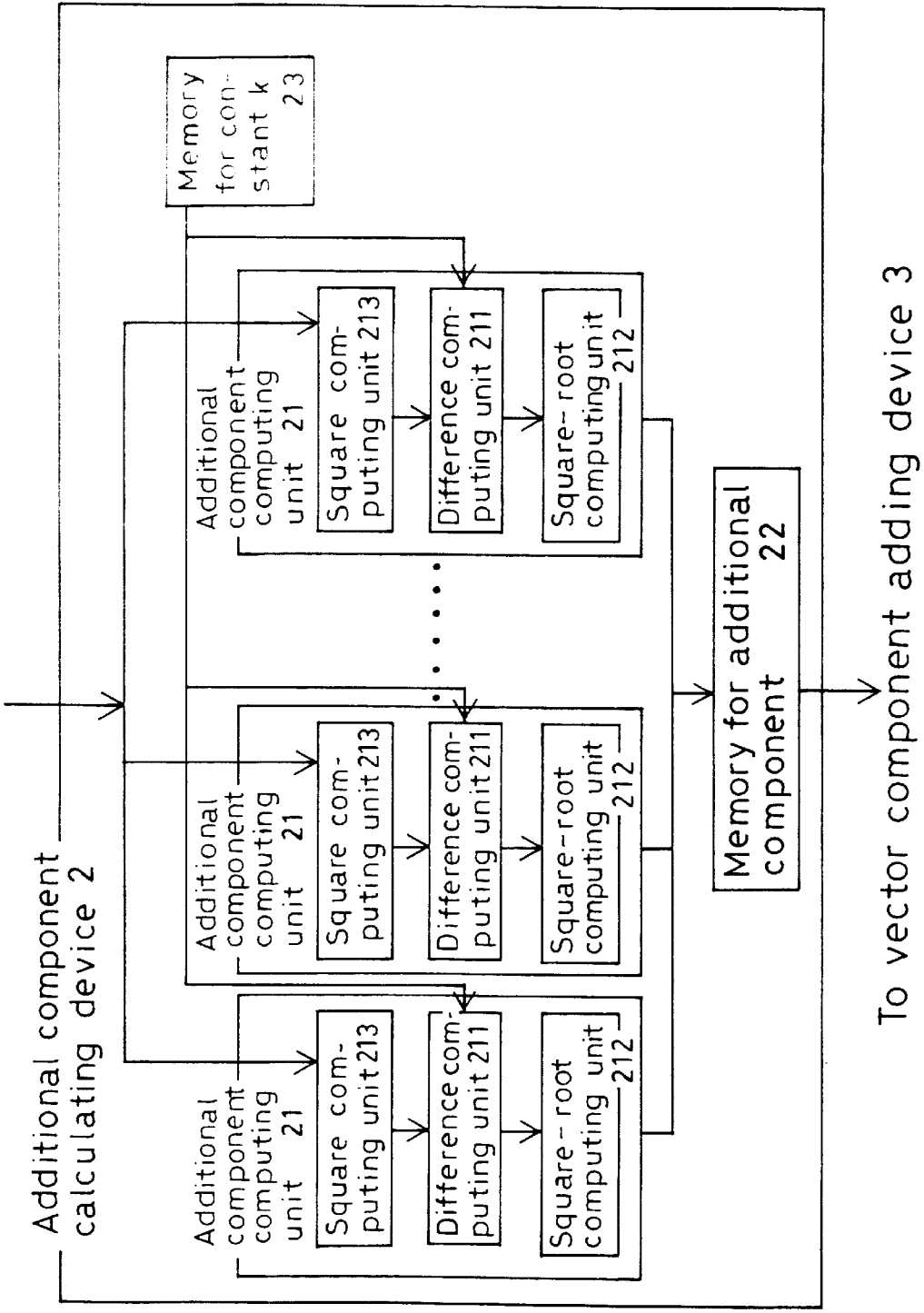
FIG. 8 is a block diagram of an essential part of a vector normalizing apparatus according to a third embodiment of the present invention.

FIG. 8 is a block diagram showing a vector normalizing apparatus according to this embodiment, which is a modification of the second embodiment. The arrangements of the constituent elements of the vector normalizing apparatus are the same as those in the second embodiment except the additional component calculating device 2. Therefore, illustration of the common constituent elements is omitted.

The additional component calculating device 2 in this embodiment includes the number of additional component computing units 21 that is equal to the number of components of a vector a, for example. The additional component calculating device 2 further includes one memory 22 for additional component, and one memory 23 for constant k. Each additional component computing unit 21 includes a square computing unit 213, a difference computing unit 211, and a square-root computing unit 212. The additional component calculating device 2 calculates additional components given by Eq. (4).

First, the square computing unit 213 in each additional component computing unit 21 calculates a square of one component of a vector a. Subsequently, the difference computing unit 211 subtracts the square from a constant k read from the memory 23. The square-root computing unit 212 calculates a square root of the result of the subtraction. The square root is written into the memory 22 as one additional component. In this way, the number of outputs from the additional component computing units 21 that is equal to the number of components of the vector a are written into the memory 22.

Using the additional components b written into the memory 22 and the vector a, the vector component adding device 3 produces a normalized vector c. The rest of the operation is the same as in the first embodiment.

It should be noted that in this embodiment the number of additional component computing units 21 that is equal to the number of components of the vector a are prepared to perform a parallel operation. It is also possible to execute a sequential operation by using a single additional component computing unit 21.

At this time, the L2-norm of all the normalized vectors c assumes a constant value, i.e. $\sqrt{(2k)}$. Furthermore, the additional components [the third and fourth components in the case of Eq. (4)] contain a value obtained by resolving the L2-norm of the vector a. Accordingly, it will be understood that information concerning the norm of the original vector is not lost by normalization [condition (A-1)]. It will also be understood that the L2-norm of the normalized vector c is uniform. In addition, it will be clear that the vector normalizing apparatus needs no device that divides vector components by norm [condition (A-2)]. Furthermore, the range of values which each component of the vector may assume after normalization is approximately constant because the additional component calculating device 2 calculates the number of additional components b that is equal to the number of components of the vector a.

Although the vector normalizing apparatus according to this embodiment is adapted to calculate additional components given by Eq. (4), if the square computing unit 213 and the square-root computing unit 212 are omitted from each additional component computing unit 21, the arrangement can readily be modified into a form for calculating additional components given by Eq. (3).

[Fourth Embodiment]

Figure 9:
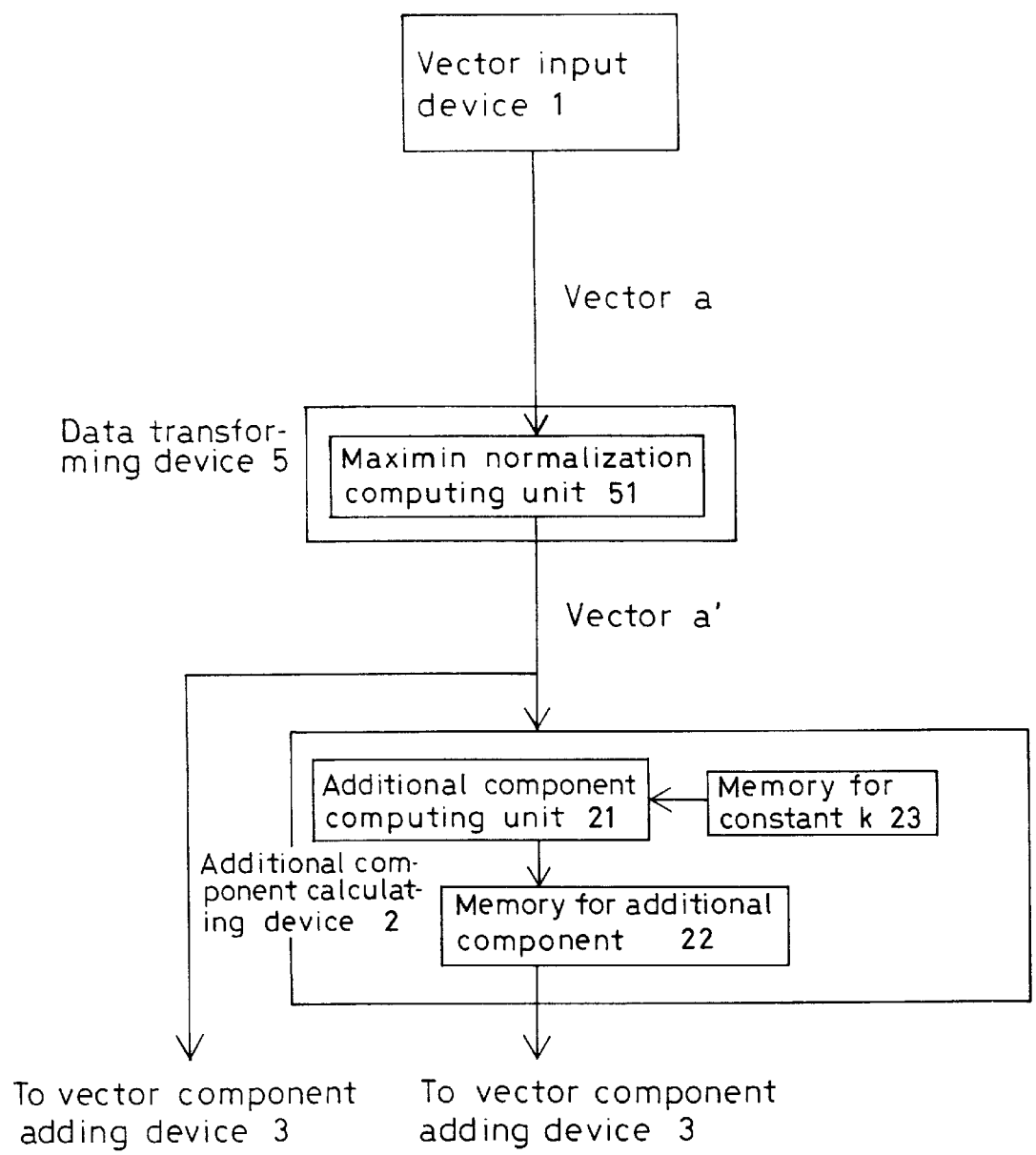
FIG. 9 is a block diagram of an essential part of a vector normalizing apparatus according to a fourth embodiment of the present invention.

FIG. 9 is a block diagram of a vector normalizing apparatus according to this embodiment, which is a modification of the first to third embodiments. A data transforming device 5 is provided in a stage preceding the additional component calculating device 2. The data transforming device 5 comprises a maxmin normalization computing unit 51, for example, which transforms each component of a vector a as expressed by Eq. (13) by using the maximum and minimum values of each component of the vector a. The transformation makes it possible to eliminate variations in the range of values that each vector component may assume. Accordingly, the gray level capacity of the competitive learning system can be effectively used, and it is possible to perform competitive learning of high accuracy.

It should be noted that many methods are usable to eliminate variations in the range of values that each vector component may assume besides Eq. (13). For example, only the maximum and minimum values may be limited. The range of possible values is not necessarily restricted to the range of from 0 to 1. Values may be limited within the range of from −1 to 1. It is also possible to use an average value of each vector component to eliminate variations in the range of possible values.

[Fifth Embodiment]

Figure 10B:
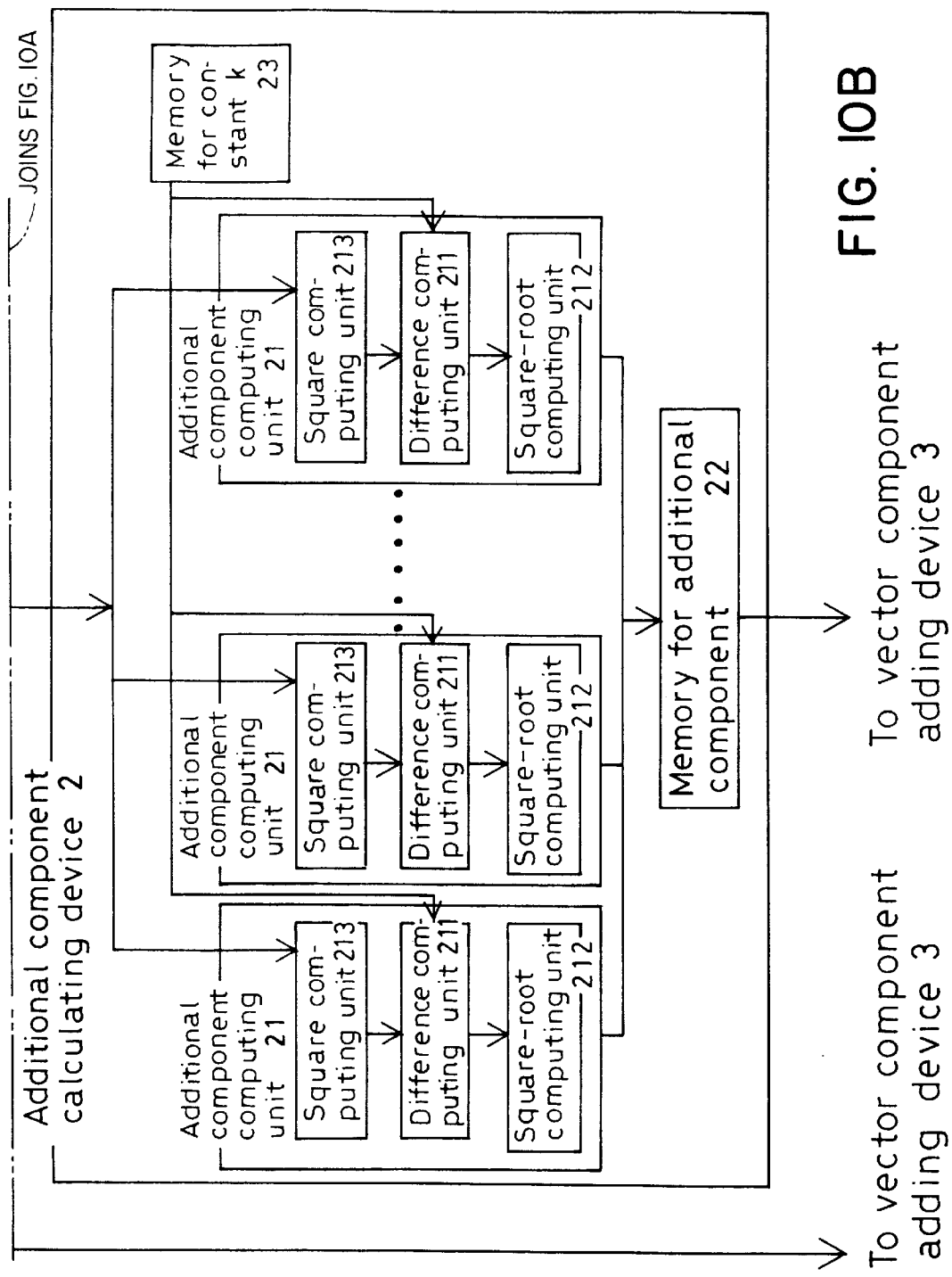
FIG. 10 is a block diagram of an essential part of a vector normalizing apparatus according to a fifth embodiment of the present invention.

FIG. 10 is a block diagram of a vector normalizing apparatus according to this embodiment, which is a modification of the third and fourth embodiments. A data transforming device 5, which includes a maxmin normalization computing unit 51 and a cosine computing unit 52, is provided in a stage preceding the additional component calculating device 2. The following description centers on the modified part of the arrangement.

First, the maxmin normalization computing unit 51 in the data transforming device 5 transforms each component of a vector a as expressed by Eq. (15) by using the maximum and minimum values of each component of the vector a. Subsequently, the cosine computing unit 52 applies the cosine function as shown by the first and second components in Eq. (16). The vector a' transformed by the data transforming device 5 is sent to the additional component calculating device 2. The additional component calculating device 2 includes the number of additional component computing units 21 that is equal to the number of components of the vector a, for example. The additional component calculating device 2 further includes one memory 22 for additional component, and one memory 23 for constant k. Each additional component computing unit 21 includes a square computing unit 213, a difference computing unit 211, and a square-root computing unit 212. The additional component calculating device 2 is adapted to calculate additional components given by Eq. (4). First, the square computing unit 213 in each additional component computing unit 21 calculates a square of one component of the vector a'. Subsequently, the difference computing unit 211 subtracts the square from a constant k read from the memory 23. The square-root computing unit 212 calculates a square root of the result of the subtraction. The square root is written into the memory 22 as one additional component. In this way, the number of outputs from the additional component computing units 21 that is equal to the number of components of the vector a are written into the memory 22.

As a result, additional components such as the third and fourth components in Eq. (16) are produced by the action of Eq. (4). It should be noted that in this embodiment, k in Eq. (4) is set equal to 1, i.e. k=1. Thereafter, using the additional components b written into the memory 22 and the vector a, the vector component adding device 3 produces a normalized vector c.

It should be noted that in this embodiment the number of additional component computing units 21 that is equal to the number of components of the vector a are prepared to perform a parallel operation. It is also possible to execute a sequential operation by using a single additional component computing unit 21. Although the cosine computing unit 52 is provided in the data transforming device 5, a sine computing unit may be provided in place of the cosine computing unit 52. In such a case, the sine function and the cosine function in Eq. (16) are merely replaced, and no problem arises.

In the vector normalizing apparatus according to this embodiment, the L2-norm of all the normalized vectors c assumes a constant value, i.e. $\sqrt{2}$ (in the case of k=1) Furthermore, the additional components [the third and fourth components in the case of Eq. (4)] contain a value obtained by resolving the L2-norm of the vector a. Accordingly, it will be understood that information concerning the norm of the original vector is not lost by normalization [condition (A-1)]. It will also be understood that the L2-norm of the normalized vector c is uniform. In addition, it will be clear that the vector normalizing apparatus needs no device that divides vector components by norm [condition (A-2)]. Furthermore, the range of values which each component of the vector may assume after normalization is approximately constant because the additional component calculating device 2 calculates the number of additional components b that is equal to the number of components of the vector a. As stated above, because a vector as represented by Eq. (16) is produced, competitive learning using the inner product as a distance measure can be performed with a high degree of accuracy closer to that in the case of using the Euclidean distance as a distance measure.

Although the vector normalizing apparatus according to this embodiment is adapted to calculate additional components given by Eq. (4), if the square computing unit 213 and the square-root computing unit 212 are omitted from each additional component computing unit 21, the arrangement can readily be modified into a form for calculating additional components given by Eq. (3).

[Sixth Embodiment]

Figure 11:
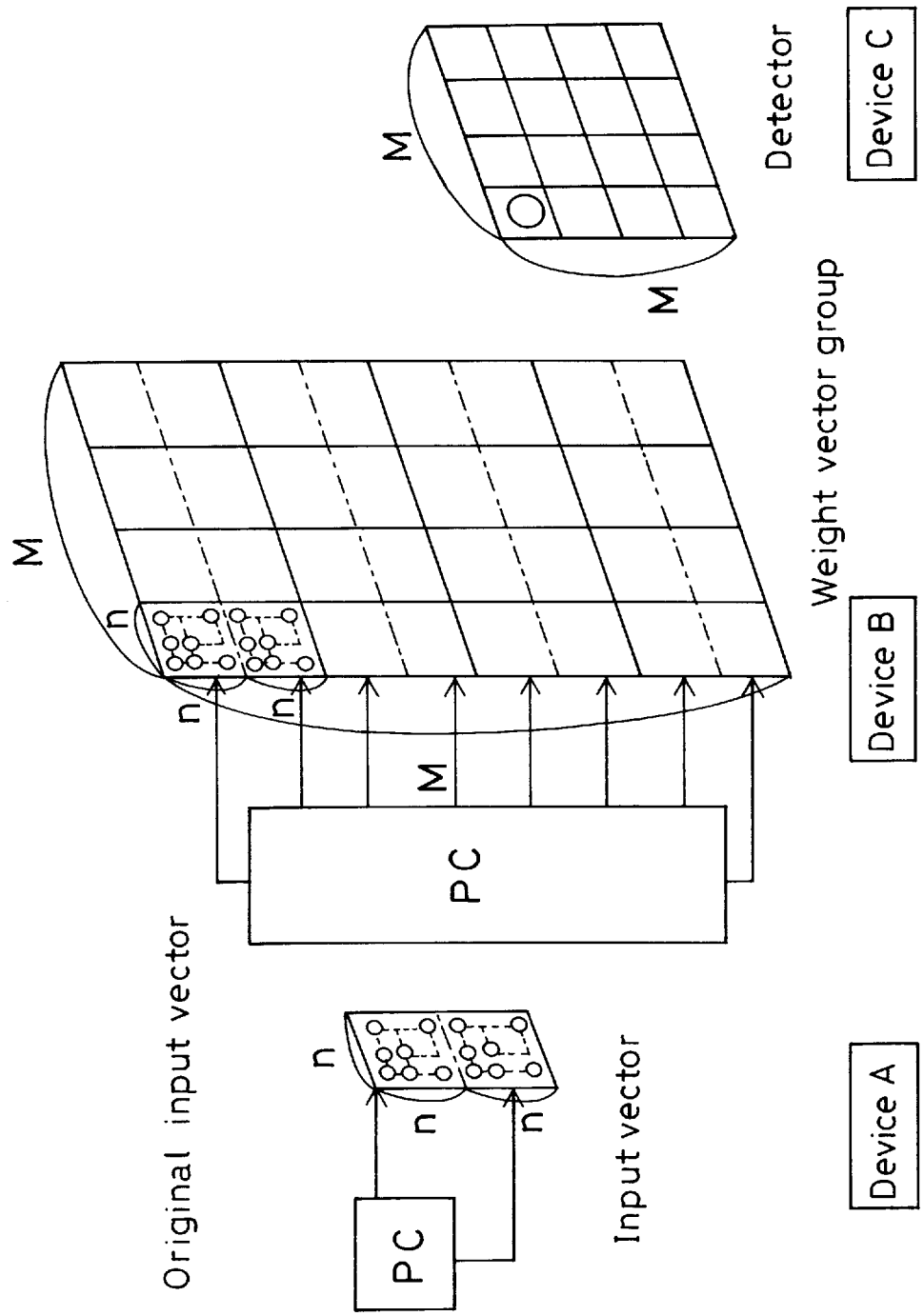
FIG. 11 is a diagram showing schematically the arrangement of a competitive learning system using a vector normalizing apparatus according to a sixth embodiment of the present invention.
Figure 12:
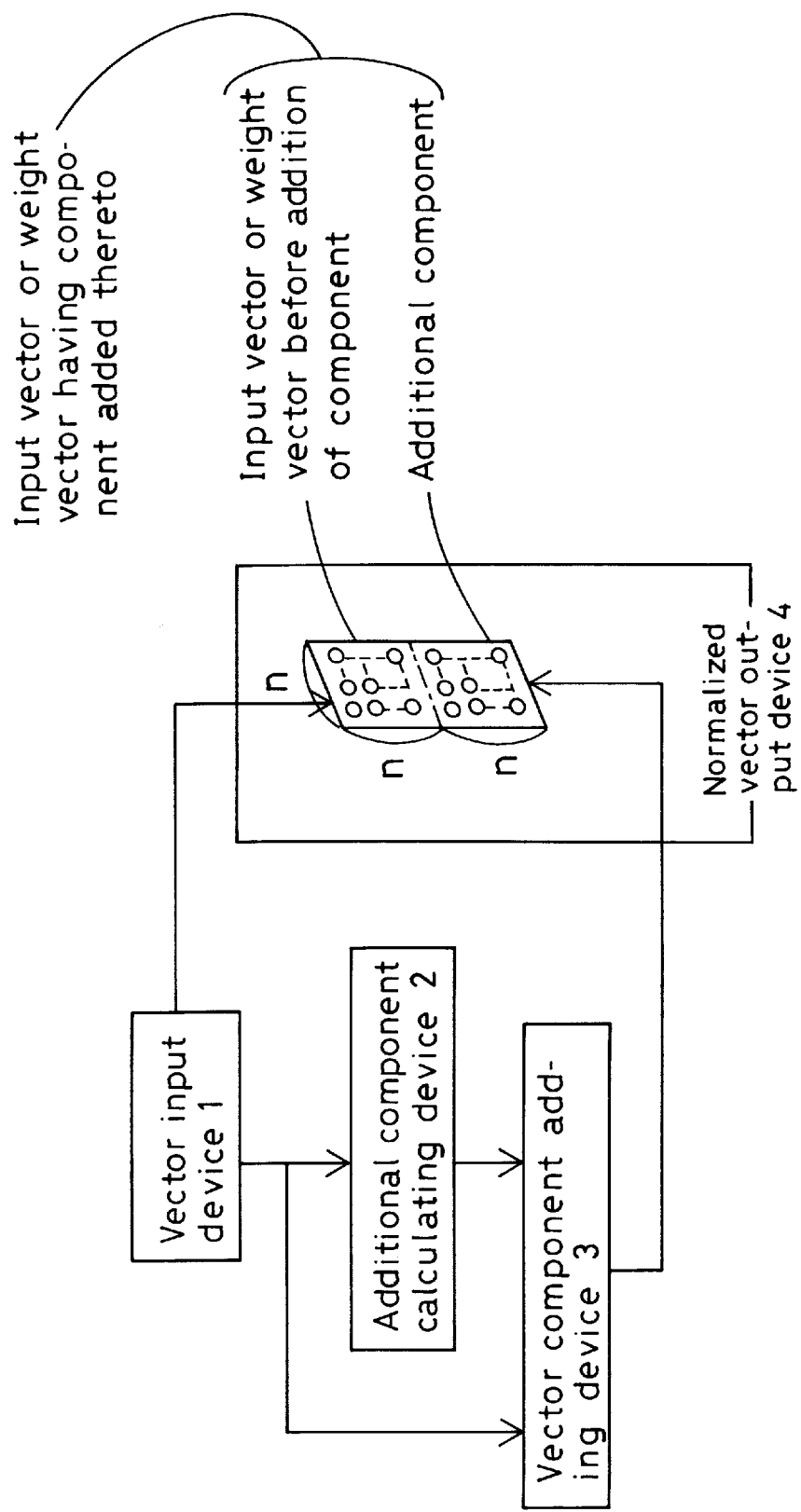
FIG. 12 is a block diagram of the vector normalizing apparatus according to the sixth embodiment of the present invention.

A vector normalizing apparatus according to this embodiment is shown in FIGS. 11 and 12. In this embodiment, the vector normalizing apparatus according to the third embodiment is incorporated into a competitive learning system.

FIG. 11 shows schematically the arrangement of this embodiment. As shown in the figure, the competitive learning system is roughly divided into three parts, i.e. a device A that outputs an input vector; a device B that outputs a group of weight vectors; and a device C equivalent to a detector that detects the value of the inner product of the input vector and each weight vector. A vector normalizing apparatus is incorporated in each of the devices A and B.

The vector normalizing apparatus will be described by using the block diagram of FIG. 12. Let us assume that the object to be handled is a medical image, for example, and consider extracting a diseased part from the medical image by the competitive learning system.

First, the vector input device 1 captures an image by using a CCD, a film scanner, etc., and produces n×n-dimensional vectors from the captured image by using a feature extracting algorithm prepared in a computer, for example. At this time, the vector input device 1 produces the number of vectors that is equal to the number of pixels in the captured image, for example. The vectors are so-called feature vectors. In this embodiment, the vectors are produced such that vectors as extracted from within a diseased part and vectors as extracted from outside the diseased part differ in the properties (e.g. mean and variance). Subsequently, the additional component calculating device 2 calculates additional components for each input vector (feature vector in this case), and the vector component adding device 3 produces a normalized vector. In this case, the number of dimensions of additional components is set to the same as the number (n×n) of dimensions of the input vector. Accordingly, the number of dimensions of the vector produced by the vector component adding device 3 is 2×n×n.

Finally, the normalized vector output device 4 outputs the normalized vector. The normalized vector output device 4 corresponds to each of the device A and B in FIG. 11. It should be noted that the constituent elements of the vector normalizing apparatus except the normalized vector output device 4 can be implemented simply by using a personal computer (abbreviated as "PC" in FIG. 11). A special-purpose computer may also be used.

All the vectors produced by this normalizing apparatus have a constant norm. Furthermore, the additional components contain information concerning the norm of the original vector [condition (A-1)]. In addition, the range of values which each component of the vector may assume after normalization is approximately constant because the additional component calculating device 2 calculates the number of additional components that is equal to the number of components of the original vector. Moreover, it will be clear that the vector normalizing apparatus needs no device that divides vector components by norm [condition (A-2)].

Next, the competitive learning system incorporating the normalizing apparatus will be described with reference to FIG. 11. The device A outputs the 2×n×n-dimensional input vector, which has n×n-dimensional components added thereto by the above-described normalizing apparatus. The device A may be formed by arranging LEDs or the like in a 2×n×n lattice-shaped array.

The device B outputs M×M weight vectors. When rewritable, the device B may be a liquid-crystal display device having an M×M array of 2×n×n pixels. When non-rewritable, the device B may be a fixed mask or the like. It should be noted that each weight vector is formed as a 2×n×n-dimensional vector to correspond to the input vector. A light signal representing the input vector, which is displayed by LEDs or the like, is superimposed on the device B through a multiple image-forming optical system (not shown), which is placed between the devices A and B, for example. It should, however, be noted that the multiple image-forming optical system is assumed to be capable of reproducing M×M vector images from the input vector image formed on the device A.

The light signal representing the input vector is subjected to intensity modulation by the fixed mask or liquid-crystal display device as the device B, which displays the weight vectors. The intensity modulation is equivalent to the multiplication of components in the vector inner product operation. The modulated signal is converged onto the device C (photodetector) through an optical system (not shown) placed between the devices B and C, for example. This operation is equivalent to the addition of the products obtained by the multiplication of the components in the inner product operation. As the result of the operation of obtaining an inner product of the input vector and each weight vector, M×M scalar quantities corresponding to the number of weight vectors are detected at the device C.

Thereafter, the largest inner product value is selected from the M×M inner product values by using, for example, a computer or a maximum value detecting circuit, and a weight vector that gives the largest inner product value is selected, which is equivalent to outputting the largest inner product value. The weight vector that gives the largest inner product value is the one that is closest to the input vector. If a class is assigned to each weight vector in advance, the system can be used as a classifier by outputting the class of a weight vector that maximizes the inner product value with respect to the input vector.

This embodiment, which is directed to medical images, may be carried out, for example, as follows. A group of weight vectors are produced from an input vector for learning whose class has previously been known. Each weight vector is assigned a class indicating whether it is a diseased part or not. Class assignment is made to pixels whose classes are unknown. Class assignment is made to all pixels in an image, and a diseased part is extracted from the image.

Preliminary learning may be performed on this competitive learning system by using a well-known neural network algorithm or the like. It is also possible to first perform learning on a computer and finally display the result of the learning on the device B. It should be noted that the classifier can be used for various purposes. When the object of classification is an image, the classifier can be used for the region segmentation of satellite photographs, for example. When the object of classification is speech, the classifier can be used for speaker recognition.

As has been stated above, all the vectors produced by the normalizing apparatus according to the present invention have a constant norm. Furthermore, the additional components contain information concerning the norm of the original vector. In addition, the range of values that each component of the vector may assume after normalization is approximately constant because the number of additional components that is equal to the number of components of the original vector are calculated. Therefore, it is possible to make good use of the gray level capacity of the competitive learning system.

Accordingly, if the normalized vector is used on the competitive learning system as an input vector or a weight vector, effective competitive learning can be performed with high accuracy.

Although the normalizing apparatus according to this embodiment is adapted to add the number of components that is equal to the number of components of the entered vector, the apparatus may be arranged to add at least one component. In such a case, the apparatus should be arranged such that, in FIGS. 11 and 12, the number of components is increased by the number of components to be added to an input vector or weight vector before the addition of a component or components.

As has been described above, it is possible according to the present invention to provide a vector normalizing apparatus that satisfies the conditions (A-1) and (A-2), i.e. a vector normalizing apparatus in which information concerning the norm of the original vector is not lost by normalization, and which needs no device that divides vector components by norm.

What we claim is:

1. A vector normalizing apparatus comprising:

vector input means for entering a vector;

additional component calculating means for receiving the vector from the vector input means and for calculating an additional component to be added to said vector, a norm of a vector after addition of said component being constant; and vector component adding means for adding the additional component to the entered vector as a component.

2. A vector normalizing apparatus according to claim 1, wherein the norm is a sum of components of the vector.

3. A vector normalizing apparatus according to claim 2, wherein the additional component calculating means has:

a memory for storing a predetermined constant;

arithmetic means for reading the predetermined constant from the memory and for subtracting the sum of components of the entered vector from said predetermined constant; and a memory for storing an output from the arithmetic means.

4. A vector normalizing apparatus according to claim 2, wherein the additional component calculating means includes:

a memory for storing a predetermined constant; and a plurality of arithmetic units corresponding to the components of the entered vector, each for subtracting the respective component of the entered vector from the predetermined constant.

5. A vector normalizing apparatus according to claim 1, wherein the norm is a square sum of components of the vector.

6. A vector normalizing apparatus according to claim 5, wherein the additional component calculating means includes:

square-sum calculating means for calculating a square sum of the components of the entered vector;

a memory for storing a predetermined constant;

difference calculating means for receiving the predetermined constant from the memory and the square sum from the square-sum calculating means and for subtracting the square sum from the predetermined constant; and square-root calculating means for calculating a square root of an output from the difference calculating means.

7. A vector normalizing apparatus according to claim 5, wherein the additional component calculating means includes:

a memory for storing a predetermined constant; and a plurality of additional component calculating units corresponding to the components of the entered vector, each one of said additional component calculating units comprising:

a square computing unit for calculating a square of each component of the components of the entered vector;

a difference computing unit for receiving the predetermined constant from the memory and the square of the component from the square computing unit and for subtracting the square of the component from the predetermined constant; and a square-root computing unit for calculating a square-root of an output from the difference computing unit.

8. A vector normalizing apparatus according to claim 1, further comprising:

transformation means for limiting the values of the components of the entered vector to a predetermined range for each component.

9. A vector normalizing apparatus according to claim 8, wherein the norm is a sum of components of the vector.

10. A vector normalizing apparatus according to claim 8, wherein the norm is a square sum of components of the vector.

11. A vector normalizing apparatus comprising:

vector input means for entering a vector;

additional component calculating means for receiving the vector from the vector input means and for calculating an additional component to be added to said vector, a norm of a vector after addition of said component being constant;

vector component adding means for adding the additional component to the entered vector as a component; and output means for displaying the vector with the additional component as an intensity of light corresponding to the component value for all components.

12. A vector normalizing apparatus according to claim 11, wherein the norm is a sum of components of the vector.

13. A vector normalizing apparatus according to claim 12, wherein the additional component calculating means has:

a memory for storing a predetermined constant;

arithmetic means for reading the predetermined constant from the memory and for subtracting the sum of components of the entered vector from said predetermined constant; and a memory for storing an output from the arithmetic means.

14. A vector normalizing apparatus according to claim 12, wherein the additional component calculating means includes:

a memory for storing a predetermined constant; and a plurality of arithmetic units corresponding to the components of the entered vector, each for subtracting the respective component of the entered vector from the predetermined constant.

15. A vector normalizing apparatus according to claim 11, wherein the norm is a square sum of components of the vector.

16. A vector normalizing apparatus according to claim 15, wherein the additional component calculating means includes:

square-sum calculating means for calculating a square sum of the components of the entered vector;

a memory for storing a predetermined constant;

difference calculating means for receiving the predetermined constant from the memory and the square sum from the square-sum calculating means and for subtracting the square sum from the predetermined constant; and square-root calculating means for calculating a square root of an output from the difference calculating means.

17. A vector normalizing apparatus according to claim 15, wherein the additional component calculating means includes:

a memory for storing a predetermined constant; and a plurality of additional component calculating units corresponding to the components of the entered vector, each one of said additional component calculating units comprising:

a square computing unit for calculating a square of each component of the components of the entered vector;

a difference computing unit for receiving the predetermined constant from the memory and the square of the component from the square computing unit and for subtracting the square of the component from the predetermined constant; and a square-root computing unit for calculating a square-root of an output from the difference computing unit.

18. A vector normalizing apparatus according to claim 11, further comprising:

transformation means for limiting the values of the components of the entered vector to a predetermined range for each component.

19. A vector normalizing apparatus according to claim 18, wherein the norm is a sum of components of the vector.

20. A vector normalizing apparatus according to claim 18, wherein the norm is a square sum of components of the vector.

21. A vector normalizing apparatus according to claim 18, wherein the transform means includes:

minimum component value finding means for receiving the all input vectors and for finding minimum component value out of the all corresponding component values for each component;

maximum component value finding means for receiving the all input vectors and for finding maximum component value out of the all corresponding component values for each component; and arithmetic means for dividing the difference between the component value of the input vector and the corresponding minimum component value by the difference between the corresponding minimum component value and the corresponding maximum component value.

22. A vector normalizing apparatus comprising:

vector input means for entering a vector as a light intensity corresponding to each component;

additional component calculating means for receiving the vector from the vector input means and for calculating an additional component to be added to said vector, a norm of a vector after addition of said component being constant; and vector component adding means for adding the additional component to the entered vector as a component.

23. A vector normalizing apparatus according to claim 22, wherein the norm is a sum of components of the vector.

24. A vector normalizing apparatus according to claim 23, wherein the additional component calculating means has:

a memory for storing a predetermined constant;

arithmetic means for reading the predetermined constant from the memory and for subtracting the sum of components of the entered vector from said predetermined constant; and a memory for storing an output from the arithmetic means.

25. A vector normalizing apparatus according to claim 23, wherein the additional component calculating means includes:

a memory for storing a predetermined constant; and a plurality of arithmetic units corresponding to the components of the entered vector, each for subtracting the respective component of the entered vector from the predetermined constant.

26. A vector normalizing apparatus according to claim 22, wherein the norm is a square sum of components of the vector.

27. A vector normalizing apparatus according to claim 26, wherein the additional component calculating means includes:

square-sum calculating means for calculating a square sum of the components of the entered vector;

a memory for storing a predetermined constant;

difference calculating means for receiving the predetermined constant from the memory and the square sum from the square-sum calculating means and for subtracting the square sum from the predetermined constant; and square-root calculating means for calculating a square root of an output from the difference calculating means.

28. A vector normalizing apparatus according to claim 26, wherein the additional component calculating means includes:

a memory for storing a predetermined constant; and a plurality of additional component calculating units corresponding to the components of the entered vector, each one of said additional component calculating units comprising:

a square computing unit for calculating a square of each component of the components of the entered vector;

a difference computing unit for receiving the predetermined constant from the memory and the square of the component from the square computing unit and for subtracting the square of the component from the predetermined constant; and a square-root computing unit for calculating a square-root of an output from the difference computing unit.

29. A vector normalizing apparatus according to claim 22, further comprising:

transformation means for limiting the values of the components of the entered vector to a predetermined range for each component.

30. A vector normalizing apparatus according to claim 29, wherein the norm is a sum of components of the vector.

31. A vector normalizing apparatus according to claim 29, wherein the norm is a square sum of components of the vector.

32. A vector normalizing apparatus according to claim 29, wherein the transform means includes:

minimum component value finding means for receiving the all input vectors and for finding minimum component value out of the all corresponding component values for each component;

maximum component value finding means for receiving the all input vectors and for finding maximum component value out of the all corresponding component values for each component; and arithmetic means for dividing the difference between the component value of the input vector and the corresponding minimum component value by the difference between the corresponding minimum component value and the corresponding maximum component value.

33. A vector normalizing apparatus comprising:

vector input means for entering a vector;

additional component calculating means for receiving the vector from the vector input means and for calculating an additional component to be added to said vector, a norm of a vector after addition of said component being constant;

vector component adding means for adding the additional component to the entered vector as a component; and output means for outputting an output from the vector component adding means as vector to be entered into a competitive learning system.

34. A vector normalizing apparatus according to claim 33, wherein the norm is a sum of components of the vector.

35. A vector normalizing apparatus according to claim 34, wherein the additional component calculating means has:

a memory for storing a predetermined constant;

arithmetic means for reading the predetermined constant from the memory and for subtracting the sum of components of the entered vector from said predetermined constant; and a memory for storing an output from the arithmetic means.

36. A vector normalizing apparatus according to claim 34, wherein the additional component calculating means includes:

a memory for storing a predetermined constant; and a plurality of arithmetic units corresponding to the components of the entered vector, each for subtracting the respective component of the entered vector from the predetermined constant.

37. A vector normalizing apparatus according to claim 33, wherein the norm is a square sum of components of the vector.

38. A vector normalizing apparatus according to claim 37, wherein the additional component calculating means includes:

square-sum calculating means for calculating a square sum of the components of the entered vector;

a memory for storing a predetermined constant;

difference calculating means for receiving the predetermined constant from the memory and the square sum from the square-sum calculating means and for subtracting the square sum from the predetermined constant; and square-root calculating means for calculating a square root of an output from the difference calculating means.

39. A vector normalizing apparatus according to claim 37, wherein the additional component calculating means includes:

a memory for storing a predetermined constant; and a plurality of additional component calculating units corresponding to the components of the entered vector, each one of said additional component calculating units comprising:

a square computing unit for calculating a square of each component of the components of the entered vector;

a difference computing unit for receiving the predetermined constant from the memory and the square of the component from the square computing unit and for subtracting the square of the component from the predetermined constant; and a square-root computing unit for calculating a square-root of an output from the difference computing unit.

40. A vector normalizing apparatus according to claim 33, further comprising:

transformation means for limiting the values of the components of the entered vector to a predetermined range for each component.

41. A vector normalizing apparatus according to claim 40, wherein the norm is a sum of components of the vector.

42. A vector normalizing apparatus according to claim 40, wherein the norm is a square sum of components of the vector.

43. A vector normalizing apparatus comprising:

vector input means for entering a vector as a signal to be processed in a competitive learning system;

additional component calculating means for receiving the vector from the vector input means and for calculating an additional component to be added to said vector, a norm of a vector after addition of said component being constant; and vector component adding means for adding the additional component to the entered vector as a component.

44. A vector normalizing apparatus according to claim 43, wherein the norm is a sum of components of the vector.

45. A vector normalizing apparatus according to claim 44, wherein the additional component calculating means has:

a memory for storing a predetermined constant;

arithmetic means for reading the predetermined constant from the memory and for subtracting the sum of components of the entered vector from said predetermined constant; and a memory for storing an output from the arithmetic means.

46. A vector normalizing apparatus according to claim 44, wherein the additional component calculating means includes:

a memory for storing a predetermined constant; and a plurality of arithmetic units corresponding to the components of the entered vector, each for subtracting the respective component of the entered vector from the predetermined constant.

47. A vector normalizing apparatus according to claim 43, wherein the norm is a square sum of components of the vector.

48. A vector normalizing apparatus according to claim 47, wherein the additional component calculating means includes:

square-sum calculating means for calculating a square sum of the components of the entered vector;

a memory for storing a predetermined constant;

difference calculating means for receiving the predetermined constant from the memory and the square sum from the square-sum calculating means and for subtracting the square sum from the predetermined constant; and square-root calculating means for calculating a square root of an output from the difference calculating means.

49. A vector normalizing apparatus according to claim 47, wherein the additional component calculating means includes:

a memory for storing a predetermined constant; and a plurality of additional component calculating units corresponding to the components of the entered vector each one of said additional component calculating units comprising:

a square computing unit for calculating a square of each component of the components of the entered vector;

a difference computing unit for receiving the predetermined constant from the memory and the square of the component from the square computing unit and for subtracting the square of the component from the predetermined constant; and a square-root computing unit for calculating a square-root of an output from the difference computing unit.

50. A vector normalizing apparatus according to claim 43, further comprising:

transformation means for limiting the values of the components of the entered vector to a predetermined range for each component.

51. A vector normalizing apparatus according to claim 50, wherein the norm is a sum of components of the vector.

52. A vector normalizing apparatus according to claim 50, wherein the norm is a square sum of components of the vector.

* * * * *